(12) United States Patent
Jang et al.

(10) Patent No.: US 11,326,544 B2
(45) Date of Patent: May 10, 2022

(54) SENSORLESS CONTROL DEVICE FOR DC FUEL PUMP

(71) Applicant: COAVIS, Sejong-si (KR)

(72) Inventors: Young Sub Jang, Sejong-si (KR); Suk Min Yun, Sejong-si (KR)

(73) Assignee: COAVIS, Sejong-si (KR)

( * ) Notice: Subject to any disclaimer, the term of this patent is extended or adjusted under 35 U.S.C. 154(b) by 0 days.

(21) Appl. No.: 17/103,147

(22) Filed: Nov. 24, 2020

(65) Prior Publication Data

US 2022/0010748 A1    Jan. 13, 2022

(30) Foreign Application Priority Data

Jul. 13, 2020 (KR) ........................ 10-2020-0085954

(51) Int. Cl.
| | |
|---|---|
| H02P 6/00 | (2016.01) |
| F02D 41/30 | (2006.01) |
| F02D 41/20 | (2006.01) |
| F02D 41/14 | (2006.01) |
| F02M 37/08 | (2006.01) |
| H02P 25/089 | (2016.01) |

(52) U.S. Cl.
CPC ..... *F02D 41/3082* (2013.01); *F02D 41/1401* (2013.01); *F02D 41/20* (2013.01); *F02M 37/08* (2013.01); *H02P 25/089* (2016.02); *F02D 2041/1432* (2013.01); *F02D 2041/2051* (2013.01); *F02D 2041/2075* (2013.01); *F02M 2037/085* (2013.01)

(58) Field of Classification Search
CPC .......... H02P 25/089; H02M 1/14; H02M 1/12
See application file for complete search history.

(56) References Cited

U.S. PATENT DOCUMENTS

2005/0282484 A1    12/2005    Kim

FOREIGN PATENT DOCUMENTS

| CN | 110422138 A | * 11/2019 | |
|---|---|---|---|
| KR | 1020050119963 A | 12/2005 | |
| KR | 1020080090192 A | 10/2008 | |
| KR | 1020170018565 A | 2/2017 | |
| KR | 101975831 B1 | 5/2019 | |
| WO | WO-2008133600 A1 | * 11/2008 | ............... H02K 1/02 |

* cited by examiner

*Primary Examiner* — Karen Masih
(74) *Attorney, Agent, or Firm* — The Webb Law Firm

(57) ABSTRACT

Provided is a sensorless control device for a DC fuel pump that may be downsized as compared to a conventional control device for a DC fuel pump and may implement the same operation at a relatively low cost, and the sensorless control device for a DC fuel pump.

5 Claims, 3 Drawing Sheets

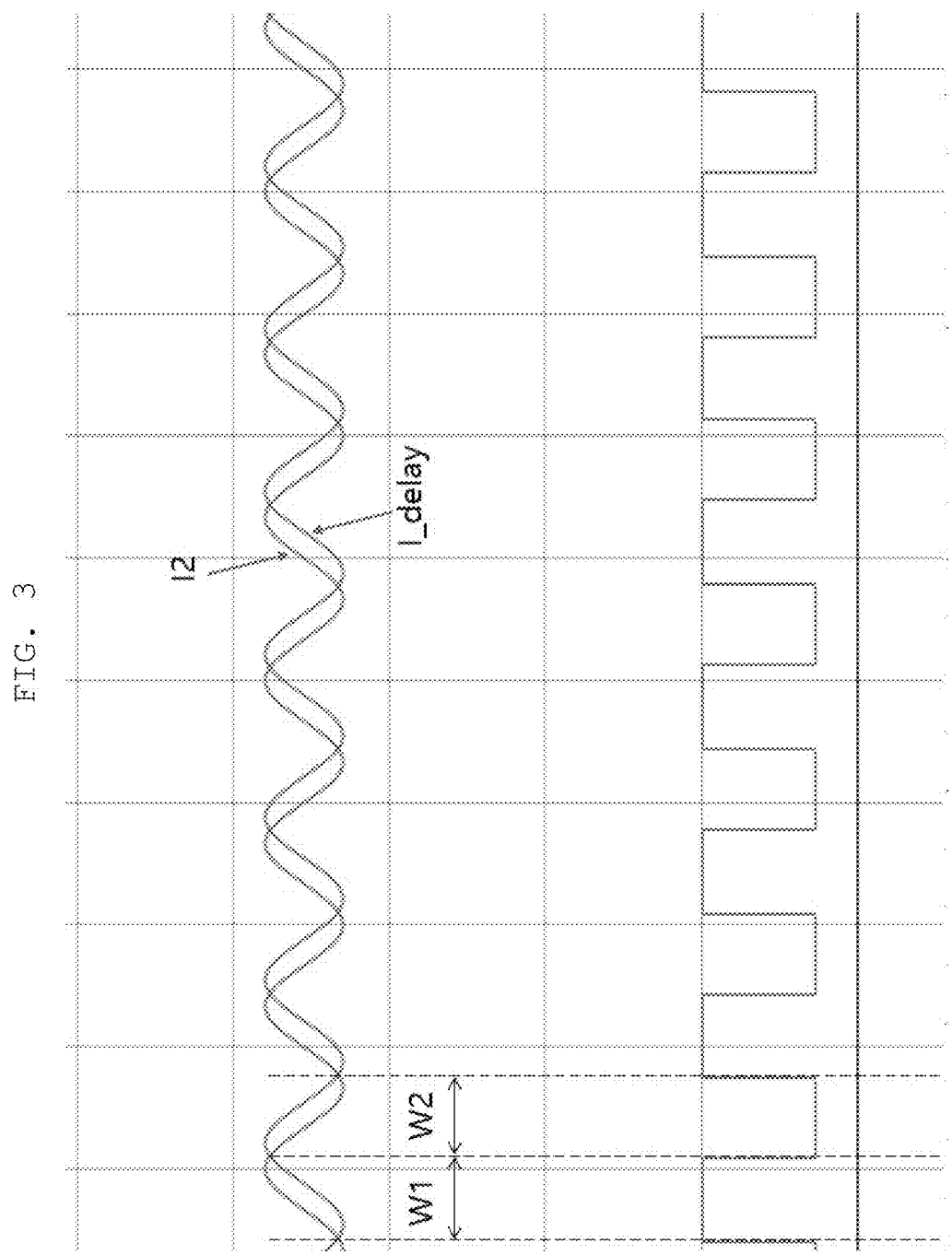

SENSORLESS CONTROL DEVICE FOR DC FUEL PUMP

CROSS-REFERENCE TO RELATED APPLICATION

This application claims priority to Korean Patent Application No. 10-2020-0085954 filed Jul. 13, 2020, the disclosure of which is hereby incorporated by reference in its entirety.

BACKGROUND OF THE INVENTION

Field of the Invention

The following disclosure relates to a sensorless control device for a direct current (DC) fuel pump.

Description of Related Art

In general, a fuel pump is installed in automobiles to pump fuel in a fuel tank and supply the fuel to an engine. The fuel pump may be installed so as to be immersed in the fuel contained in the fuel tank, and in order to drive an impeller provided in the fuel pump, the impeller and a DC motor are coupled and formed integrally.

As a method of measuring the revolutions per minute (RPM) of a DC motor included in a DC fuel pump, there is a method of detecting a ripple generated when the DC motor is operated. In more detail, the ripple generated when a conventional DC motor is operated represents a waveform that repeats an up and down pattern based on a predetermined voltage. In the conventional method, such a ripple is smoothed and the RPM of the DC motor is measured by counting the number of times the ripple becomes larger or smaller than the reference voltage.

The conventional method of measuring the RPM of such a DC motor requires a circuit and a current sensor for smoothing the ripple, so that the DC fuel pump has a relatively complex structure, and there was a problem that economical efficiency is also deteriorated.

RELATED ART DOCUMENT

[Patent Document]
Korean Patent Publication No. 10-1975831 ("Fuel pump having permanent magnet synchronous motor" published on May 8, 2019)

SUMMARY OF THE INVENTION

An embodiment of the present invention is directed to providing a sensorless control device for a DC fuel pump capable of measuring and controlling the RPM of a DC motor at relatively low cost by providing a more simplified control device.

In one general aspect, a sensorless control device for a DC fuel pump includes: a measuring unit for measuring an input voltage of a power terminal of a DC motor included in the DC fuel pump; a first removing unit for outputting a first voltage from which a DC component included in the input voltage measured by the measuring unit is removed; a second removing unit for removing a switching component from the first voltage and amplifying a signal from which the switching component is removed to output a second voltage; a delay unit for outputting a delay signal obtained by delaying the second voltage by a predetermined degree; a square wave generation unit for generating a square wave by comparing the second voltage and the delay signal; and a calculation unit for calculating revolutions per minute (RPM) of the DC motor by counting a cycle of the square wave.

The sensorless control device for a DC fuel pump may further include a control unit that compares the RPM of the motor calculated by the calculation unit with a target RPM, controls switches connected to the motor, and controls the RPM of the motor to the target RPM.

The second removing unit may include a band pass filter or a high pass filter.

The second removing unit may further include an amplifier disposed at a rear end of the band pass filter or the high pass filter to amplify and output an input signal.

The delay unit may include a comparator.

BRIEF DESCRIPTION OF THE DRAWINGS

FIG. 3 illustrates waveforms of a second voltage output in a state in which a switching component is removed by a second removing unit, a delay voltage output from a delay unit, and a square wave output from a square wave generation unit of the sensorless control device for a DC fuel pump according to an embodiment of the present invention.

DESCRIPTION OF THE INVENTION

Hereinafter, an embodiment of a sensorless control device for a DC fuel pump according to the present invention will be described in detail with reference to the accompanying drawings.

Figure 1:
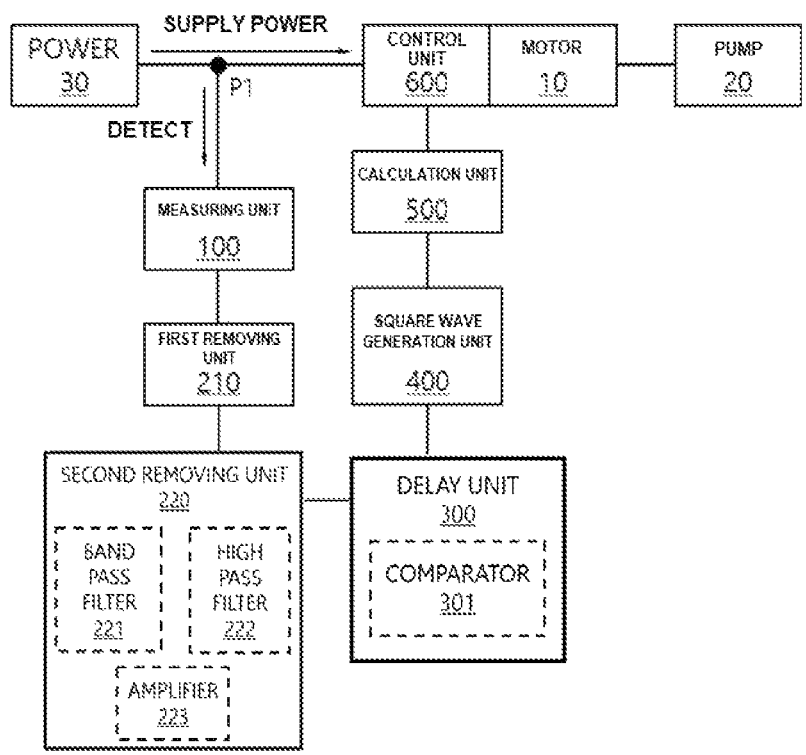
FIG. 1 is a block diagram of a sensorless control device for a DC fuel pump according to an embodiment of the present invention.

FIG. 1 schematically illustrates a sensorless control device for a DC fuel pump according to an embodiment of the present invention.

As illustrated in FIG. 1, the sensorless control device for a DC fuel pump according to an embodiment of the present invention may be applied to a DC fuel pump installed in a vehicle. The DC fuel pump may include a pump 20 for discharging fuel, a DC motor 10 connected to the pump to operate the pump, and a power supply 30 supplying DC power to the DC motor 10.

As illustrated in FIG. 1, the sensorless control device for a DC fuel pump according to an embodiment of the present invention may include a measuring unit 100, a first removing unit 210, a second removing unit 220, a delay unit 300, a square wave generation unit 400, a calculation unit 500, and a control unit 600.

As illustrated in FIG. 1, the measuring unit 100 measures an input voltage applied from the power supply 30 to the DC motor 10 (via the control unit 600). The input voltage measured by the measuring unit 100 may be output as a signal of a specific waveform. The measuring unit 100 may include a circuit that detects the input voltage, and measures the input voltage applied from the power supply 30 to the DC motor 10 at a point P1 based on FIG. 1. The input voltage at point P1 is in a state in which a DC component applied from the power supply 30 to the DC motor 10, a ripple caused by driving the DC motor 10, and a switching component (an alternating current (AC component) of the DC motor 10 are mixed, and therefore, in a waveform measured by the measuring unit 100, the DC voltage, the ripple, and the switching component (AC component) appear together.

The first removing unit 210 removes and outputs the DC component from the input voltage measured by the measuring unit 100. In the sensorless control device for a DC fuel pump according to an embodiment of the present invention, the first removing unit 210 may remove the DC component using various methods. As a method used by the first removing unit 210 to remove the DC component, an AC-coupling technique may be used or a method of limiting passage of a frequency component of a specific band may be used.

The first removing unit 210 may include a capacitor to utilize the AC-coupling technique, or may include a low pass filter to limit the passage of the frequency component of the specific band. In addition, the first removing unit 210 may include a DC-feedback circuit in order to use a method other than the AC-coupling technique and the method of limiting the passage of the frequency component of the specific band as described above. For convenience of explanation, the voltage output after removing the DC component included in the input voltage by the first removing unit 210 is referred to as a first voltage.

Figure 2:
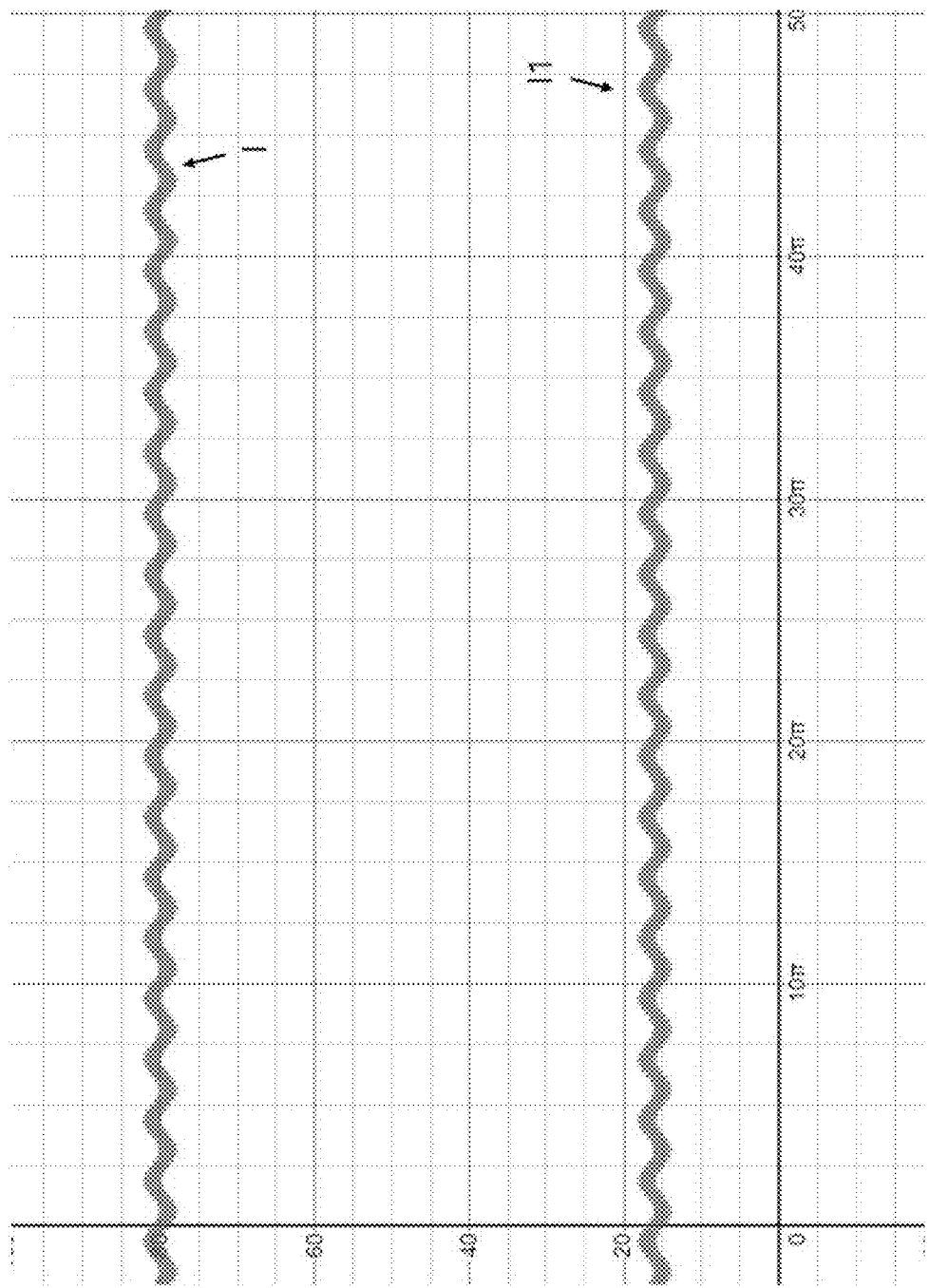
FIG. 2 illustrates waveforms of an input voltage measured by a measuring unit and a first voltage output in a state in which a DC component is removed by the first removing unit of the sensorless control device for a DC fuel pump according to an embodiment of the present invention.

FIG. 2 illustrates a waveform of the input voltage I measured by the measuring unit 100 and a waveform of the first voltage I1 output from the first removing unit 210, respectively.

Since an ideal direct current may be expressed as a straight line of a constant height in a graph illustrated in FIG. 2, it may be seen that the first voltage I1 from which the DC component is removed from the input voltage I by the first removing unit 210 has a waveform lowered by a certain degree from the input voltage I as illustrated in FIG. 2. Since the first removing unit 210 removes only the DC component from the input voltage I, only the ripple component and the switching component exist in the first voltage I1.

The second removing unit 220 amplifies the corresponding voltage after removing the switching component from the first voltage I1. In general, since the switching component of the DC motor has a relatively high frequency band, the second removing unit 220 may include at least one of a band pass filter 221 and a high pass filter 222 to remove the switching component included in the first voltage I1.

In the present embodiment, the second removing unit 220 limits passage of components having a frequency of 15 kHz to 20 kHz through the band pass filter 221 and the high pass filter 222, because the frequency of 15 kHz to 20 kHz is a frequency of the switching component of the motor. However, in the present invention, the switching frequency band removed by the second removing unit 220 is not limited to the above-described 15 kHz to 20 kHz, and it is possible to remove switching frequency components of other frequency bands.

When the switching component is removed through the filter 221, 222 included in the second removing unit 220, only the ripple component is output. In general, since the ripple component has very small amplitude, it may be difficult to count the ripple or use the ripple to produce another signal. Therefore, the second removing unit 220 of the present invention amplifies and outputs the ripple component output by removing the switching frequency component. For convenience of explanation, the voltage finally output from the second removing unit 220 is referred to as a second voltage I2. The second removing unit 220 may further include an amplifier 223 to amplify the ripple component filtered by the filter 221, 222.

The delay unit 300 outputs a delay voltage obtained by delaying the second voltage I2 output from the second removing unit 220 by a certain degree. Here, the delay means delaying a phase of the second voltage I2 so that the second voltage I2 and the delay voltage are alternated with each other. The delay unit 300 may include a comparator 301.

FIG. 3 illustrates waveforms of the second voltage I2 and the delay voltage I_delay.

As illustrated in FIG. 3, since the second voltage I2 and the delay voltage I_delay repeat a specific waveform like a sine wave, the second voltage I2 has a value higher than the delay voltage I_delay in a first section W1, and the second voltage I2 has a lower value than the delay voltage I_delay in a second section W2, based on one cycle of the second voltage I2. That is, the first section W1 and the second section W2 appear regularly and repeatedly based on a predetermined cycle.

The square wave generation unit 400 generates a square wave by comparing the second voltage I2 with the delay voltage I_delay. The square wave generation unit 400 may include a comparator for the above-described operation, and the square wave generation unit 400 including the comparator may generate the square wave by outputting high when the second voltage I2 has a higher value than the delay voltage I_delay and low when the second voltage I2 has a lower value than the delay voltage I_delay. The square wave formed by the square wave generation unit 400 is illustrated below the delay voltage I_delay of FIG. 3.

A cycle of the square wave illustrated in FIG. 3 is the same as the cycle of the second voltage I2, and therefore, a current RPM of the DC motor 10 may be checked by counting how many times the square wave is repeated during a reference time (1 minute in case of RPM). Therefore, the calculation unit 500 of the present invention calculates the current RPM of the DC motor 10 by counting the cycle of the square wave during the reference time.

The control unit 600 can check the RPM of the DC motor 10 currently operating through RPM information calculated by the calculation unit 500, and may control the RPM of the DC motor 10 using the calculated RPM information.

According to the sensorless control device for a DC fuel pump according to an embodiment of the present invention as described above, since the current RPM of the motor may be checked using the ripple even if there is no circuit to smooth the ripple compared to the conventional method, the control device may be downsized as compared to the conventional control device and has an effect of improving economic efficiency.

Since the sensorless control device for the DC fuel pump according to the present invention as described above removes the DC component and the switching component included in the input voltage by each of the first removing unit and the second removing unit, and then measures the RPM of the motor using the removed signal, the conventional circuit for smoothing the ripple is not required, and as a result, the control device according to various embodiments of the present invention may be downsized and economical efficiency may also be improved.

The present invention is not limited to the above-mentioned embodiments, and may be variously applied, and may be variously modified without departing from the gist of the present invention claimed in the claims.

DETAILED DESCRIPTION OF MAIN ELEMENTS

10: DC motor
20: pump
30: power supply
100: measuring unit
210: first removing unit
220: second removing unit
300: delay unit
400: square wave generation unit
500: calculation unit
600: control unit

What is claimed is:

1. A sensorless control device for a DC fuel pump, the sensorless control device comprising:
    a measuring unit for measuring an input voltage of a power terminal of a DC motor included in the DC fuel pump;
    a first removing unit for outputting a first voltage from which a DC component included in the input voltage measured by the measuring unit is removed;
    a second removing unit for removing a switching component from the first voltage and amplifying a signal from which the switching component is removed to output a second voltage;
    a delay unit for outputting a delay signal obtained by delaying the second voltage by a predetermined degree;
    a square wave generation unit for generating a square wave by comparing the second voltage and the delay signal; and
    a calculation unit for calculating revolutions per minute (RPM) of the DC motor by counting a cycle of the square wave.

2. The sensorless control device for a DC fuel pump of claim 1, further comprising a control unit that compares the RPM of the motor calculated by the calculation unit with a target RPM, controls switches connected to the motor, and controls the RPM of the motor to the target RPM.

3. The sensorless control device for a DC fuel pump of claim 1, wherein the second removing unit includes a band pass filter or a high pass filter.

4. The sensorless control device for a DC fuel pump of claim 3, wherein the second removing unit further includes an amplifier disposed at a rear end of the band pass filter or the high pass filter to amplify and output an input signal.

5. The sensorless control device for a DC fuel pump of claim 1, wherein the delay unit includes a comparator.

* * * * *